US010239371B2

(12) United States Patent
Slesinski et al.

(10) Patent No.: US 10,239,371 B2
(45) Date of Patent: Mar. 26, 2019

(54) LIGHTWEIGHT PUSHER/TAG AXLE

(71) Applicant: Dana Heavy Vehicle Systems Group, LLC, Maumee, OH (US)

(72) Inventors: Steven G. Slesinski, Ann Arbor, MI (US); Steven J. Wesolowski, Waterville, OH (US); James F. Ziech, Kalamazoo, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 10 days.

(21) Appl. No.: 15/348,074

(22) Filed: Nov. 10, 2016

(65) Prior Publication Data

US 2017/0129559 A1    May 11, 2017

Related U.S. Application Data

(63) Continuation-in-part of application No. 14/938,517, filed on Nov. 11, 2015, now abandoned.

(Continued)

(51) Int. Cl.
*B62D 61/12* (2006.01)
*B60B 35/08* (2006.01)
(Continued)

(52) U.S. Cl.
CPC ............... *B60G 5/04* (2013.01); *B60K 17/22* (2013.01); *B60K 17/24* (2013.01); *B62D 61/125* (2013.01);
(Continued)

(58) Field of Classification Search
CPC ........ B62D 61/125; B62D 61/12; B60G 5/04; B60G 2400/61; B60G 2200/42;
(Continued)

(56) References Cited

U.S. PATENT DOCUMENTS 1,857,249 A      5/1932   Marcum
1,887,494 A  *  11/1932   Murray, Jr. ............ B21D 53/90
                                                    228/155
(Continued)

FOREIGN PATENT DOCUMENTS

DE         19920670 A1    11/2000
EP          1500525 A2     1/2005
WO          9117898       11/1991

OTHER PUBLICATIONS

Machine-generated English Translation of DE19920670, obtained via Espacenet Patent Search.

(Continued)

*Primary Examiner* — Keith J Frisby
(74) *Attorney, Agent, or Firm* — Marshall & Melhorn, LLC

(57) ABSTRACT

A non-driven axle for a vehicle or a trailer is provided. The non-driven axle includes a first arm portion, a second arm portion, and a central portion. The first arm portion is for rotatably mounting a first wheel hub. The second arm portion is for rotatably mounting a second wheel hub. The second arm portion is on an axial end of the central portion opposite the first arm portion. The central portion is between the first arm portion and the second arm portion and may be substantially arch-shaped or substantially ring-shaped. The substantially arch-shaped central portion includes a main portion and a radially inner portion. The substantially ring-shaped central portion includes a main portion and an inner portion. The non-driven axle reduces a weight of a vehicle or trailer while capable of being lifted without interfering with an operation of a drive axle.

6 Claims, 3 Drawing Sheets

Related U.S. Application Data

(60) Provisional application No. 62/263,926, filed on Dec. 7, 2015.

(51) Int. Cl.
  *B60G 5/04* (2006.01)
  *B60K 17/22* (2006.01)
  *B60K 17/24* (2006.01)
  *F16C 3/02* (2006.01)
  *B60B 35/04* (2006.01)
  *B60B 35/02* (2006.01)

(52) U.S. Cl.
  CPC .............. *F16C 3/02* (2013.01); *B60B 35/025* (2013.01); *B60B 35/04* (2013.01); *B60B 35/08* (2013.01); *B60G 2200/42* (2013.01); *B60G 2204/47* (2013.01); *B60G 2206/31* (2013.01); *B60G 2206/32* (2013.01); *B60G 2300/402* (2013.01); *B60G 2400/61* (2013.01); *F16C 2326/05* (2013.01)

(58) Field of Classification Search
  CPC ............ B60G 2206/30; B60G 2206/31; B60G 2206/312; B60G 2206/32; B60G 2300/402; B60B 35/02; B60B 35/025; B60B 35/04; B60B 35/06; B60B 35/08; B21D 53/90

USPC ...................... 280/86.5; 180/209; 301/124.1
  See application file for complete search history.

(56) References Cited

U.S. PATENT DOCUMENTS

| | | |
|---|---|---|
| 2,952,326 A | 9/1960 | Page |
| 3,471,166 A | 10/1969 | Clark |
| 4,726,598 A | 2/1988 | Walters |
| 5,076,391 A | 12/1991 | Ljungholm et al. |
| 5,505,482 A * | 4/1996 | VanDenberg ............ B60G 5/04 280/124.157 |
| 5,775,458 A | 7/1998 | Salo |
| 5,845,723 A | 12/1998 | Hirahara et al. |
| 6,763,906 B1 | 7/2004 | Momiyama et al. |
| 7,232,398 B2 | 6/2007 | Garcia et al. |
| 7,410,440 B2 | 8/2008 | Garcia et al. |
| 2015/0054243 A1 | 2/2015 | Elliott |

OTHER PUBLICATIONS

Machine-genereated English Translation of EP1500525, obtained via Espacenet Patent Search.
Extended European Search Report of Application No. 16198364.8 (dated May 5, 2017).

* cited by examiner

LIGHTWEIGHT PUSHER/TAG AXLE

CROSS-REFERENCE TO RELATED APPLICATIONS

This application is claiming the benefit, under 35 U.S.C. 119(e), of the provisional application granted Ser. No. 62/263,926 filed on Dec. 7, 2015 and non-provisional U.S. application Ser. No. 14/938,517 filed on Nov. 11, 2015, the entire disclosures of which are hereby incorporated by reference.

FIELD

The present disclosure relates to a non-driven axle for a vehicle or a trailer that reduces the weight of the vehicle or trailer while remaining capable of being lifted without interfering with the operation of a drive axle.

BACKGROUND

Commercial vehicles or trailers having two or more rear axles allow such vehicles to carry greater loads when compared to vehicles and trailers having a single axle. Further, tractive effort and load distribution can be increased in these vehicles.

Any axle beyond one may be a drive axle or a dead axle. When an additional axle is a dead axle, it may be positioned before (a pusher axle) or after (a tag axle) a drive axle. Further, the additional axle may be configured as a lift axle. However, vehicles and trailers including additional axles have many drawbacks as a result of the presence of the additional axles.

Conventional installations of additional non-driven axles tend to be heavy. Despite a lack of drive components, such designs still greatly increase the overall weight of the vehicle or trailer. Consequently, the efficiency of the vehicle is negatively affected.

When it is desired that an additional non-driven axle is configured as a pusher axle, the axle also must be configured to not interfere with a driveshaft used with the driven axle. Most commonly, the axle is designed to include a "bend" that accommodates a path of the driveshaft. To further complicate the pusher axle configuration, many pusher axles are also configured to be lift axles. When an additional axle is configured as both a pusher and a lift axle, the axle design must accommodate the driveshaft as the non-driven axle moves from a lowered to a raised position.

It would be advantageous to develop a non-driven axle for a vehicle or a trailer that reduces the weight of the vehicle or trailer while capable of being lifted without interfering with the operation of a drive axle.

SUMMARY

A non-driven axle including a first arm portion, a second arm portion, and a substantially arch-shaped central portion. The first arm portion has a first wheel hub rotatably mounted thereto. The second arm portion has a second wheel hub rotatably mounted thereto. The second arm portion is on an axial end of the central portion opposite the first arm portion. The substantially arch-shaped central portion is positioned between the first arm portion and the second arm portion and includes a main portion and a radially inner portion. The main portion is a hollow, arcuate member having an arch-shaped cross-section and the radially inner portion is a substantially arch-shaped member disposed against and coupled to an open side of the main portion.

In another embodiment, a non-driven axle includes a first arm portion, a second arm portion, and a substantially ring-shaped central portion. The first arm portion has a first wheel hub rotatably mounted thereto. The second arm portion has a second wheel hub rotatably mounted thereto. The second arm portion is on an axial end of the central portion opposite the first arm portion. The substantially ring-shaped central portion is disposed between the first arm portion and the second arm portion. The central portion includes a main portion and a radially inner portion. The main portion is a hollow, ring-shaped member having an arch-shaped cross-section and the radially inner portion is disposed within and coupled to the main portion.

In yet another embodiment, a non-driven axle includes a first arm portion, a second arm portion, and a substantially ring-shaped central portion where the central portion includes a main portion and an inner ring bearing assembly. The main portion is a hollow, ring-shaped member having an U-shaped cross-section. The inner ring bearing assembly includes a tube portion, a bearing support structure, and a center bearing disposed within and coupled to the main portion.

BRIEF DESCRIPTION OF THE DRAWINGS

The above, as well as other advantages of the present embodiments, will become readily apparent to those skilled in the art from the following detailed description when considered in the light of the accompanying drawings in which.

DETAILED DESCRIPTION OF THE PREFERRED EMBODIMENTS

It is to be understood that the embodiments may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions, orientations or other physical characteristics relating to the embodiments disclosed are not to be considered as limiting, unless expressly stated otherwise.

Figure 1A:
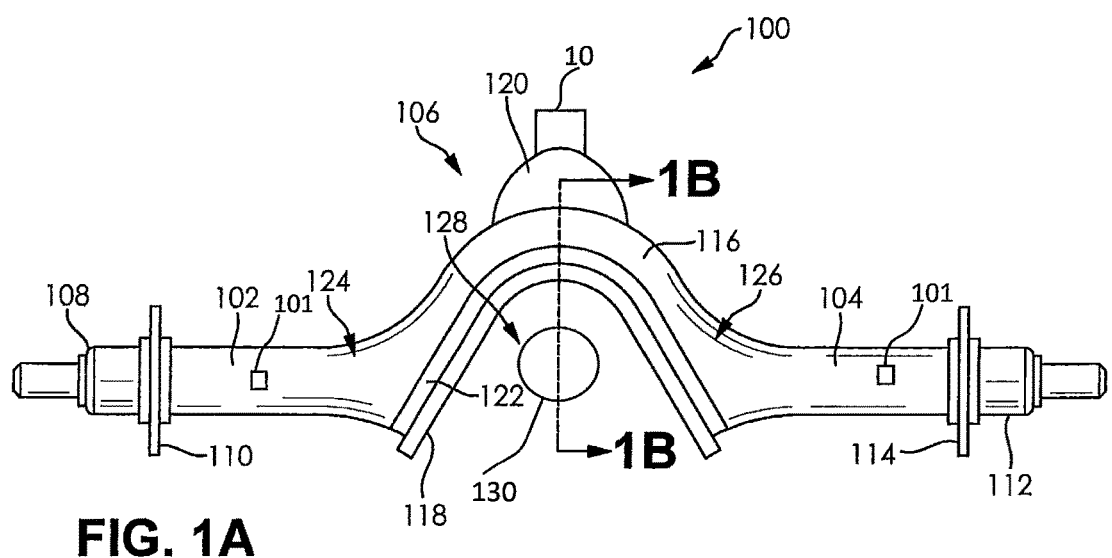
FIG. 1A is a front elevation view of an axle according to one preferred embodiment.

FIG. 1A illustrates an axle 100 according to a preferred embodiment. The axle 100 is a non-driven axle for use with a vehicle or a trailer. The axle 100 may be configured for use as a pusher or a tag axle. The axle 100 may be in engagement with a lift system 10 for placing and removing the axle 100 from a position where at least two wheels (not shown)

rotatably mounted to the axle 100 contact a surface that the vehicle or trailer is traversing. The axle 100 includes a first arm portion 102, a second arm portion 104, and a central portion 106. The central portion 106 connects the first arm portion 102 and the second arm portion 104. The axle 100, as depicted, is formed by welding a plurality of cast or forged components together; however, it is understood that the components of the axle 100 may be formed using other processes including, but not limited to, cold working or stamping. The axle 100 is preferably formed from a steel; however, it is understood that other rigid materials may be used.

The first arm portion 102 is a hollow, radially extending elongate portion of the axle 100. As shown in FIG. 1A, the cross-sectional shape of the first arm portion 102 is circular; however, it is understood that other cross-sectional shapes including, but not limited to, square, rectangular, or oval, may also be used. A distal end 108 of the first arm portion 102 is configured for rotatably mounting a wheel hub (not shown) thereto. A brake flange 110 is securely coupled to the first arm portion 102, such as through a weld. It is understood that the first arm portion 102 may be configured in another manner, depending on an intended use of the axle 100. For example, the first arm portion 102 may be configured with a suspension bracket to facilitate engagement with a lift system 10 or an air suspension system (not shown).

The second arm portion 104 is a hollow, radially extending, elongate portion of the axle 100 on the axially opposite end of the central portion 106 than the first arm portion 102. As shown in FIG. 1A, the cross-sectional shape of the second arm portion 104 is circular; however, it is understood that other cross-sectional shapes including, but not limited to, square, rectangular, or oval, may also be used. A distal end 112 of the second arm portion 104 is configured for rotatably mounting a wheel hub (not shown) thereto. A brake flange 114 is securely coupled to the second arm portion 104, such as through a weld. It is understood that the second arm portion 104 may be configured in another manner, depending on an intended use of the axle 100. For example, the second arm portion 104 may be configured with a suspension bracket to facilitate engagement with a lift system 10 or an air suspension system (not shown).

Figure 1B:
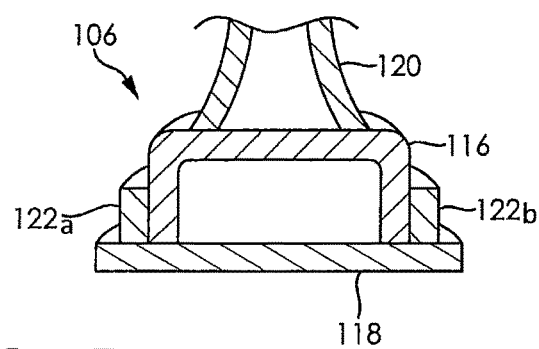
FIG. 1B is a partial, sectional view of the axle shown in FIG. 1A, along the line 1B-1B of FIG. 1A.

The central portion 106 is a hollow, substantially arch-shaped assembly connecting the first arm portion 102 and the second arm portion 104. The central portion 106 projects radially outward and away from the first and second arm portions 102, 104. The central portion 106 includes a main portion 116, a radially inner portion 118, and a suspension bracket 120. The radially inner portion 118 and the suspension bracket 120 are directly coupled to the main portion 116. The radially inner portion 118 and the suspension bracket 120 may be coupled to the main portion 116 through welding; however, it is understood that other manners of coupling can be used. The radially inner portion 118 has fluid tight seal with the main portion 116. As shown in FIGS. 1A and 1B, the central portion 106 can also include at least one reinforcing member 122 disposed between the main portion 116 and the radially inner portion 118.

The main portion 116 is a hollow, arcuate member joining the first arm portion 102 and the second arm portion 104. As shown in FIG. 1A, the main portion 116 may have a substantially arched cross-section that transitions into the cross-sectional shape of the first arm portion 102 at a first transition portion 124. The arched cross-section also transitions into the cross-sectional shape of the second arm portion 104 at a second transition portion 126.

The radially inner portion 118 is an arched member disposed against and coupled to an open side of the main portion 116. The radially inner portion 118 is preferably formed from plate steel and is welded to the main portion 116; however, it is understood that the radially inner portion 118 may be formed in another manner and coupled to the main portion 116 in any conventional manner. As shown in FIG. 1B, in one embodiment, the radially inner portion 118 is a flat, plate having a width greater than a width of the main portion 116 providing a surface to which the at least one reinforcing member 122 may be attached to.

The reinforcing member 122 can be an arcuate member welded to both the main portion 116 and the radially inner portion 118; however, it is understood that a design of the main portion 116 or the radially inner portion 118 may include a similar feature. As shown in FIGS. 1A-1B, the axle 100 can include two reinforcing members 122a, 112b. The reinforcing member 122a, 122b can be bands that extend along the outer surface of the main portion 116. Reinforcing members 122a, 122b can be positioned at the intersection of the main portion 116 and the radially inner portion 118 to reinforce the seam created at the intersection.

The suspension bracket 120 is a member disposed against and welded to the main portion 116 at a central location radially outward from and radially opposite the radially inner portion 118. The suspension bracket 120 facilitates engagement between the axle 100 and to a portion of the lift system 10. Further, the suspension bracket 120 may be configured to engage with an air suspension system (not shown). It is understood that the suspension bracket 120 may also be located on another portion of the axle 100 or that the suspension bracket 120 may include a pair of spaced apart members disposed opposite from one another on the axle 100.

In use, the axle 100 may be utilized as a tag or a pusher axle in a tandem axle assembly (not shown). When utilized as a pusher axle, the axle 100 defines a driveshaft operation area 128 within, radially inward from the radially inner portion 118 and axially between the first arm portion 102 and the second arm portion 104. The driveshaft operation area 128 provides clearance for the operation of a driveshaft 130 while permitting the axle 100 and an associated drive axle (not shown) to move as part of a vehicle suspension system (not shown). Further, the driveshaft operation area 128 provides clearance between the driveshaft 130 and the axle 100 for a lifting and a lowering of the axle 100 as performed by the lift system 10. More particularly, the driveshaft operation area 128 provides a predetermined distance between the driveshaft 130 and the axle 100 even when the axle 100 is raised, lowered or moved during vehicle operation.

When the axle 100 is configured to provide clearance for lifting and lowering of the axle 100 as performed by the lift system 10, a control system (not shown) may direct the lift system 10 to operate in response to a detection by a sensor or a plurality of sensors 101 that a load of the vehicle incorporating the axle 100 has changed. The sensors 101 are in communication with the control system that is in communication with the lift system 10. In one embodiment, the sensors are load sensors 101 including, but not limited to, force sensors arranged on the axle 100 for detecting one or more load indication parameters.

As a first non-limiting example, in response to a detected decrease in load by the control system, the lift system 10 may be engaged to place the axle 100 in a lifted condition, where wheels associated with the axle 100 do not engage a surface that the vehicle is traversing. Placing the axle 100 in the lifted condition provides the vehicle the benefits of reduced tire wear for diminished loads, an improvement to a fuel efficiency of the vehicle, and a reduced toll cost (where such toll costs are dependent on a number of engaged axles). Further, as a second non-limiting example, in response to a detected increase in load by the control system, the lift system 10 may be engaged to place the axle 100 in a dropped condition, where wheels associated with the axle 100 engage a surface that the vehicle is traversing. Placing the axle 100 in the dropped condition provides the vehicle the benefits of distributing a load of the vehicle between the axle 100 and a drive axle (not shown).

Figure 2A:
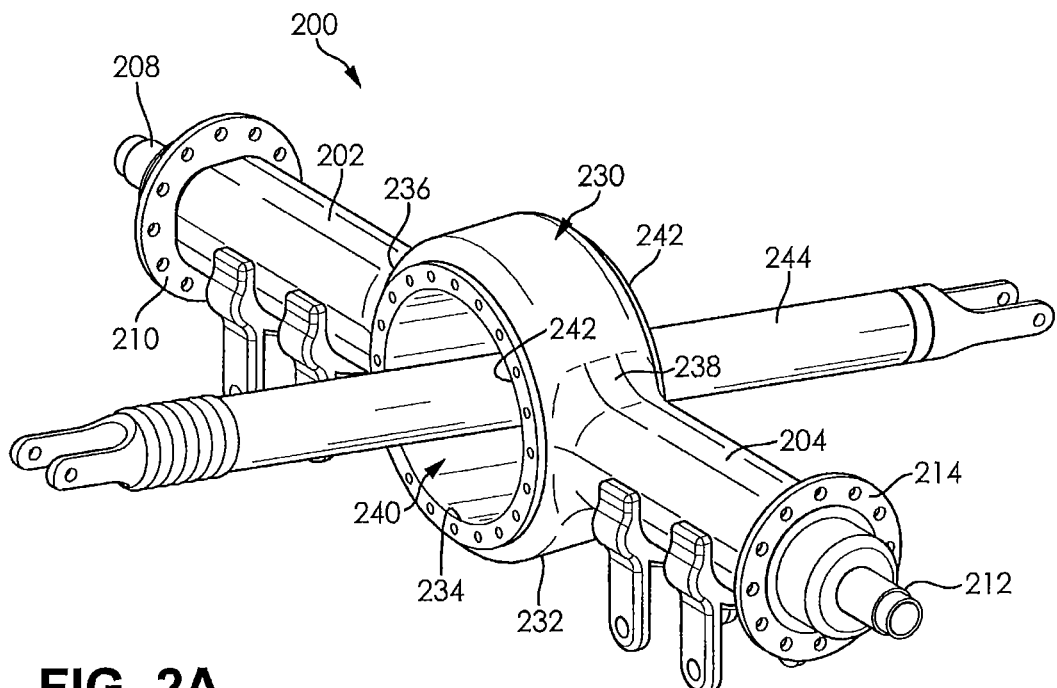
FIG. 2A is a side perspective view of an axle and a driveshaft according to another preferred embodiment.
Figure 2B:
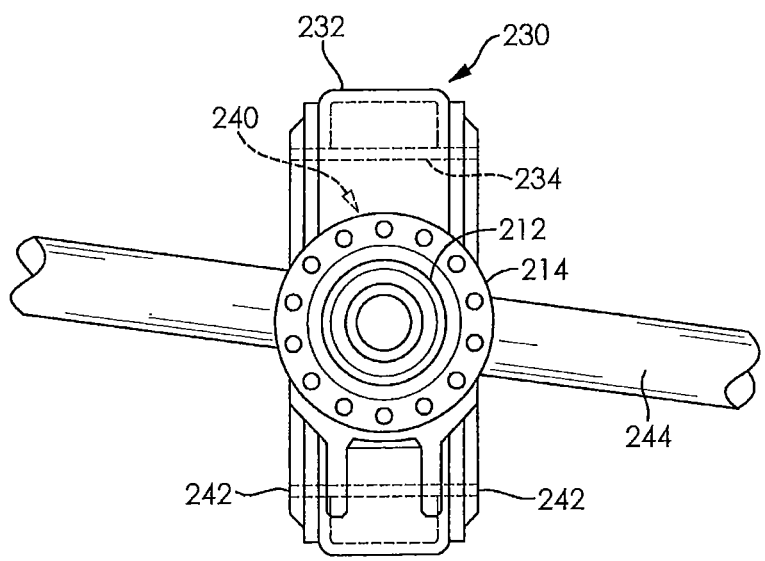
FIG. 2B is a side elevation view of the axle and driveshaft shown in FIG. 2B.

FIGS. 2A and 2B illustrate an axle 200 according to another preferred embodiment. As shown in FIGS. 2A and 2B, the axle 200 includes similar components to the axle 100 illustrated in FIGS. 1A and 1B. Similar features of the embodiment shown in FIGS. 2A and 2B are numbered similarly in series, with the exception of the features described below.

The axle 200 is a non-driven axle for use with a vehicle or a trailer. The axle 200 may be configured for use as a pusher or a tag axle. The axle 200 may be in engagement with a lift system (not shown) for placing and removing the axle 200 from a position where at least two wheels (not shown) rotatably mounted to the axle 200 contact a surface that the vehicle or trailer is traversing. The axle 200 includes a first arm portion 202, a second arm portion 204, and a central portion 230. The axle 200 is formed by welding a plurality of cast or forged components together; however, it is understood that the components of the axle 200 may be formed using other processes, such as cold working or stamping. The axle 200 is preferably formed from a steel; however, it is understood that other rigid materials may be used.

The central portion 230 is a hollow, substantially ring-shaped assembly connecting the first arm portion 202 and the second arm portion 204. The central portion 230 includes a main portion 232 and a radially inner portion 234. In one embodiment, as shown in FIGS. 2A-2B, the radially inner portion 234 is substantially ring-shaped and has a constant thickness. The radially inner portion 234 is welded to an inner surface of the main portion 232; however, it is understood that the radially inner portion 234 may be coupled to the main portion 232 in another manner. The radially inner portion 234 has a fluid tight seal with the main portion 232.

The main portion 232 is a hollow, substantially ring-shaped member joining the first arm portion 202 and the second arm portion 204. The main portion 232 has an arched shaped cross-section that transitions into the cross-sectional shape of the first arm portion 202 at a first transition portion 236. The arch-shaped cross-section also transitions into the cross-sectional shape of the second arm portion 204 at a second transition portion 238. The main portion 232 defines a driveshaft operation area 240 that extends through the center thereof. An inner surface of the radially inner portion 234 defines an aperture 242 formed therein which defines the driveshaft operation area 240.

The radially inner portion 234 is a ring-shaped member disposed within and welded to the main portion 232; however, it is understood that the radially inner portion 234 may be coupled to the main portion 232 in another manner. The radially inner portion 234 has a constant thickness that is substantially equal to or larger than the diameter of the main portion 232.

In use, the axle 200 may be utilized as a tag or a pusher axle in a tandem axle assembly (not shown). When utilized as a pusher axle, the axle 200 defines the driveshaft operation area 240 through the main portion 232 and axially between the first arm portion 202 and the second arm portion 204. The driveshaft operation area 240 provides clearance for the operation of a driveshaft 244 while permitting the axle 200 and an associated drive axle (not shown) to move as part of a vehicle suspension system (not shown). Further, the driveshaft operation area 240 provides clearance for lifting and lowering of the axle 200 as performed by the lift system (not shown). More particularly, the driveshaft operation area 240 provides a predetermined distance between the driveshaft 244 and the axle 200 even when the axle 200 is raised, lowered or moved during vehicle operation.

When the axle 200 is configured to provide clearance for a lifting and a lowering of the axle 200 as performed by the lift system, a control system (not shown) may direct the lift system to operate in response to a detection by a sensor or a plurality of sensors that a load of the vehicle incorporating the axle 200 has changed. The sensors are in communication with the control system which is in communication with the lift system.

As a first non-limiting example, in response to a detected decrease in load by the control system, the lift system may be engaged to place the axle 200 in a lifted condition, where wheels associated with the axle 200 do not engage a surface that the vehicle is traversing. Placing the axle 200 in the lifted condition provides the vehicle the benefits of reduced tire wear for diminished loads, an improvement to a fuel efficiency of the vehicle, and a reduced toll cost (where such toll costs are dependent on a number of engaged axles). Further, as a second non-limiting example, in response to a detected increase in load by the control system, the lift system may be engaged to place the axle 200 in a dropped condition, where the wheels associated with the axle 200 engage a surface that the vehicle is traversing. Placing the axle 200 in the dropped condition provides the vehicle the benefits of distributing a load of the vehicle between the axle 200 and a drive axle (not shown).

Figure 3A:
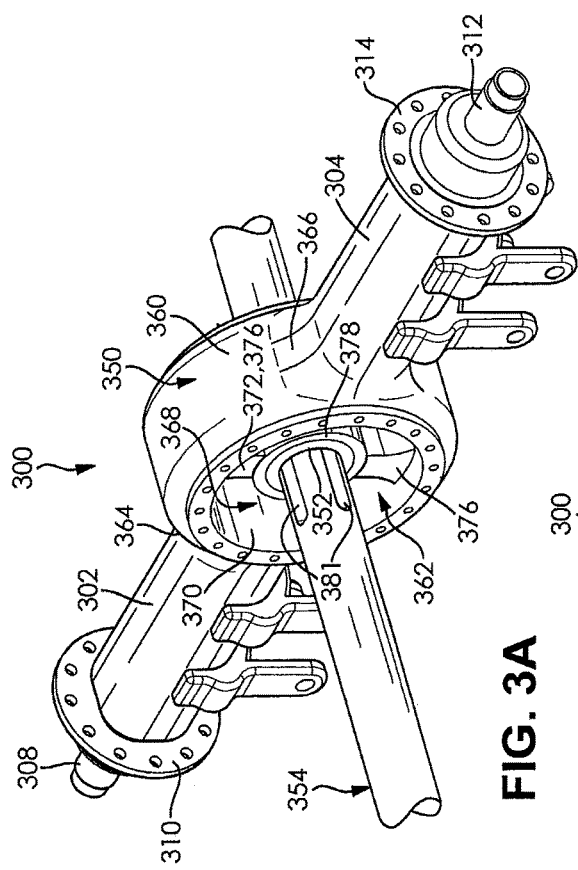
FIG. 3A is a side perspective view of an axle and a portion of a section of a jointed driveshaft according to another preferred embodiment.
Figure 3B:
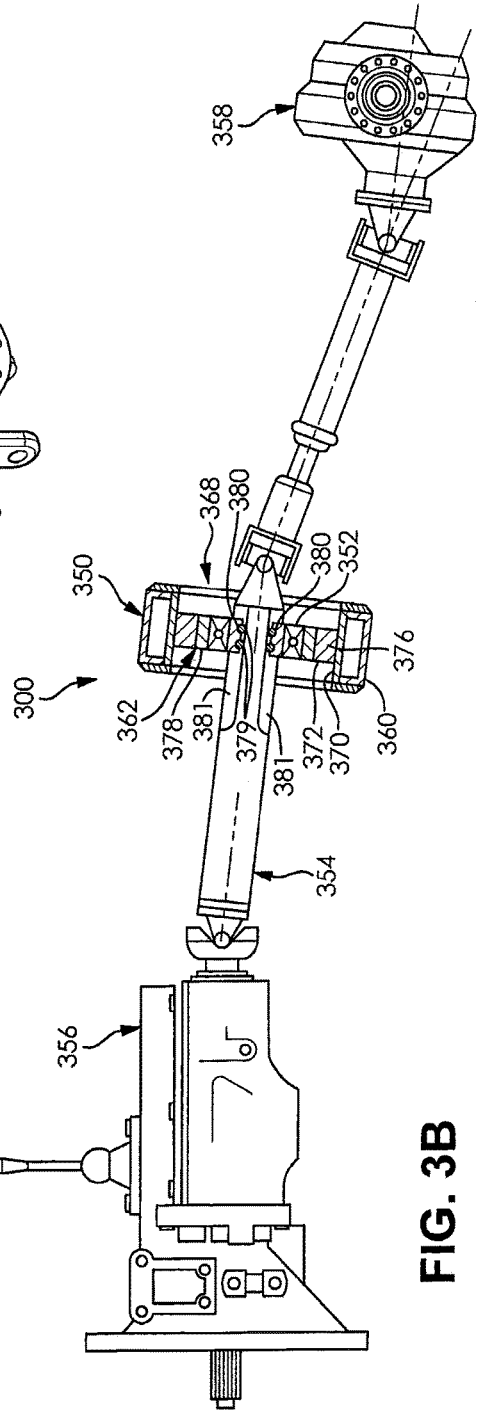
FIG. 3B is a side elevation view of the axle and the jointed driveshaft shown in FIG. 3A, further including a vehicle transmission and a drive axle.

FIGS. 3A and 3B illustrates an axle 300 (shown in cross-section in FIG. 3B) according to another preferred embodiment. The axle 300 includes similar components to the axle 200 illustrated in FIGS. 2A and 2B. Similar features of the embodiment shown in FIGS. 3A and 3B are numbered similarly in series, with the exception of the features described below. The axle 300 is a non-driven axle for use with a vehicle or a trailer. The axle 300 as shown in FIG. 3A is configured for use as a pusher axle. The axle 300 may be in engagement with a lift system (not shown) for placing and removing the axle 300 from a position where at least two wheels (not shown) rotatably mounted to the axle 300 contact a surface that the vehicle or trailer is traversing.

The axle 300 includes a first arm portion 302, a second arm portion 304, and a central portion 350. The central portion 350 connects the first arm portion 302 and the second arm portion 304. The axle 300 is formed by welding a plurality of cast or forged components together; however, it is understood that the components of the axle 300 may be formed using other processes including, but not limited to, cold working or stamping. The axle 300 is preferably formed from a steel; however, it is understood that other rigid materials may be used. As shown in FIG. 3A, the axle 300 includes a center bearing 352 mounted in the axle 300. A section of a jointed driveshaft 354 is mounted in the center bearing 352. The jointed driveshaft 354 facilitates driving engagement between a vehicle transmission 356 and a drive axle 358.

The central portion 350 is a hollow, substantially ring-shaped assembly between the first arm portion 302 and the second arm portion 304. The central portion 350 includes a main portion 360 and an inner ring bearing assembly 362. A portion of the inner ring bearing assembly 362 is welded to the main portion 360; however, it is understood that the inner ring bearing assembly 362 may be coupled to the main portion 360 in another manner.

The main portion 360 is a hollow, substantially ring-shaped member joining the first arm portion 302 and the second arm portion 304. The main portion 360 has an U-shaped cross-section that transitions into the cross-sectional shape of the first arm portion 302 at a first transition portion 364. The U-shaped cross-section also transitions into the cross-sectional shape of the second arm portion 304 at a second transition portion 366. The main portion 360 defines a driveshaft operation area 368 through the center thereof therethrough.

The inner ring bearing assembly 362 is disposed within and welded to the main portion 360; however, it is understood that the inner ring bearing assembly 362 may be coupled to the main portion 360 in another manner. The inner ring bearing assembly 362 includes a radially inner portion 370, a bearing support structure 372, and the center bearing 352.

The radially inner portion 370 is a ring-shaped member disposed within and welded to the main portion 360 and the bearing support structure 372. The radially inner portion 370 has a constant thickness that is substantially equal to or larger than the diameter of the main portion 360.

The bearing support structure 372 is a hollow member having at least two support members 376 extending radially therefrom. The support members 376 are welded to the radially inner portion 370 and a bearing mount 378. As shown in FIG. 3B, the bearing support structure 372 includes two support members 376, but it is understood that another number or a single support member covering an interior of the radially inner portion 370 may also be used. The bearing mount 378 is a hollow member into which the center bearing 352 is disposed. An outer race of the center bearing 352 is engaged with the bearing mount 378 to prevent rotation thereof within the bearing mount 378, such as through a press fit, but it is understood that other methods and configurations may be used to prevent rotation of the center bearing 352. Further, the center bearing 352 may be flexibly (but not rotationally) mounted in the bearing mount 378 using an elastomeric material. Flexibly mounting of the center bearing 352 permits the axle 300 to be raised or lowered accounting for any misalignment between the center bearing 352 and the jointed driveshaft 354 during such a process.

The center bearing 352 receives a section of the jointed driveshaft 354. The center bearing 352 is a roller bearing configured for mounting a portion of the jointed driveshaft 354 therein for rotatably supporting the jointed driveshaft 354 during operation of a vehicle the axle 300 is incorporated in. Alternately, the center bearing 352 may be configured as a spherical bearing which permits a portion of the center bearing 352 to rotate with the jointed driveshaft 354 as the axle 300 is raised or lowered.

As shown in FIGS. 3A and 3B, an inner race of the center bearing 352 is engaged with an outer surface of the jointed driveshaft 354 to prevent rotation therebetween, while also allowing the center bearing 352 to move axially along a portion of the section of the jointed driveshaft 354. In response to the axle 300 being raised or lowered, a position of the center bearing 352 along the jointed driveshaft 354 may need to be adjusted. A plurality of bearings 379 (or similar guide features) are partially disposed in recesses 380 in the inner race of the center bearing 352 and axial races 381 formed in the outer surface of the jointed driveshaft 354. When the axle 300 is raised or lowered, the bearings 379 rotate within the recesses 380 and move along the axial races 381 in response to movement of the jointed driveshaft 354. While not shown in FIGS. 3A and 3B, the jointed driveshaft 354 and the bearing support structure 372 may be fitted with a flexible slip joint cover to ensure that the bearings 379 and the center bearing 352 are operated in a clean environment.

In use, the axle 300 is utilized as a pusher axle in a tandem axle assembly (not shown). The axle 300 including the inner ring bearing assembly 362 defines the driveshaft operation area 368 through the main portion 360 and between the first arm portion 302 and the second arm portion 304. The driveshaft operation area 368 provides clearance for the operation of the jointed driveshaft 354 while permitting the axle 300 and the associated drive axle 358 to move as part of a vehicle suspension system (not shown). Further, the driveshaft operation area 368 provides clearance for a lifting and a lowering of the axle 300 as performed by the lift system (not shown).

When the axle 300 is configured to provide clearance for a lifting and a lowering of the axle 300 as performed by the lift system, a control system (not shown) may direct the lift system to operate in response to a detection by a sensor or a plurality of sensors that a load of the vehicle incorporating the axle 300 has changed. The sensors are in communication with the control system which is communication with the lift system. As a first non-limiting example, in response to a detected decrease in load by the control system, the lift system may be engaged to place the axle 300 in a lifted condition, where wheels associated with the axle 300 do not engage a surface the vehicle incorporating the axle 300 is incorporated in is traversing. Placing the axle 300 in the lifted condition provides the vehicle the benefits of reduced tire wear for diminished loads, an improvement to a fuel efficiency of the vehicle, and a reduced toll cost (where such toll costs are dependent on a number of engaged axles). Further, as a second non-limiting example, in response to a detected increase in load by the control system, the lift system may be engaged to place the axle 300 in a dropped condition, where wheels associated with the axle 300 engage a surface the vehicle incorporating the axle 300 is incorporated in is traversing. Placing the axle 300 in the dropped condition provides the vehicle the benefits of distributing a load of the vehicle between the axle 300 and a drive axle (not shown).

In accordance with the provisions of the patent statutes, the present designs have been described in what is considered to represent the preferred embodiments. However, it should be noted that these embodiments can be practiced otherwise than as specifically illustrated and described without departing from its scope or spirit.

What is claimed:

1. A non-driven axle, comprising:
a first arm portion for rotatably mounting a first wheel hub;
a second arm portion for rotatably mounting a second wheel hub; and
a substantially ring-shaped central portion between the first arm portion and the second arm portion, the central portion comprising a main portion and an inner portion, wherein the main portion is a hollow, ring-shaped member having a U-shaped cross-section and the inner portion is disposed within and coupled to the main portion,
wherein the second arm portion is on an axial opposite end of the central portion than the first arm portion, wherein the inner portion includes a radially inner portion, a bearing support structure and a center bearing.

2. The non-driven axle according to claim 1, wherein the first arm portion and the second arm portion each further comprise a suspension bracket that facilitates engagement between the non-driven axle and a lift system.

3. The non-driven axle according to claim 1, wherein the central portion defines a driveshaft operating area through the main portion and between the first arm portion and the second arm portion.

4. The non-driven axle according to claim 1, wherein the non-driven axle further comprises a first transition portion and a second transition portion, wherein the U-shaped cross-section of the main portion transitions into a cross-sectional shape of the first arm portion and the second arm portion at the first transition portion and the second transition portion.

5. The non-driven axle according to claim 1, wherein the bearing support structure is a hollow member having a bearing mount and at least two support members extending radially therefrom.

6. The non-driven axle according to claim 1, wherein the center bearing receives and rotatably supports a section of a driveshaft that is configured to allow the center bearing to move axially along a portion of the section of the driveshaft.

* * * * *